July 3, 1945.
D. G. C. HARE
2,379,800
SIGNAL TRANSMISSION SYSTEM
Filed Sept. 11, 1941
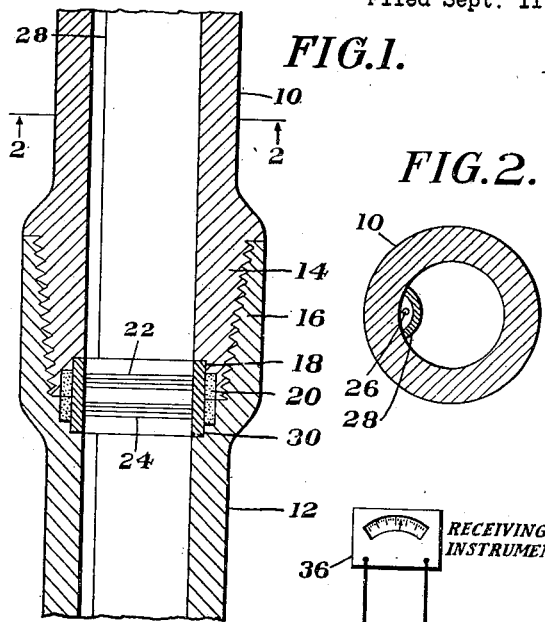
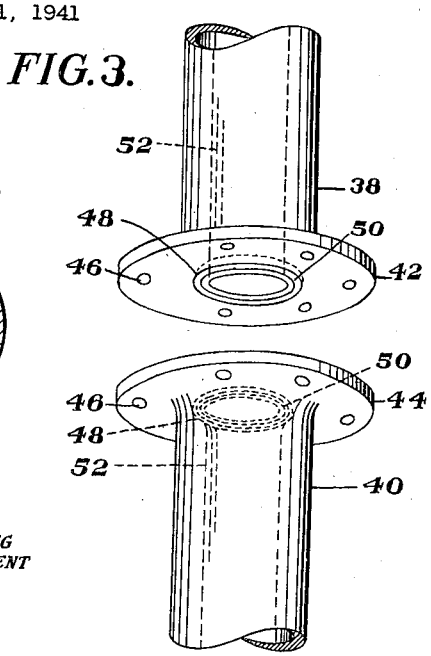
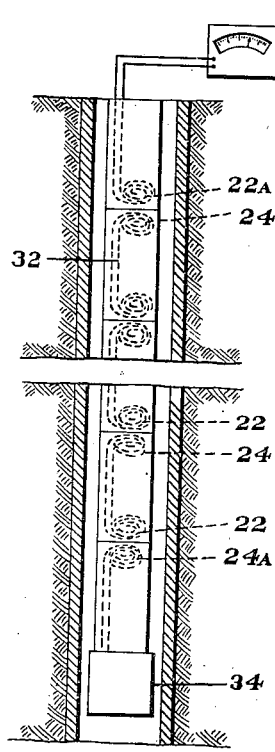
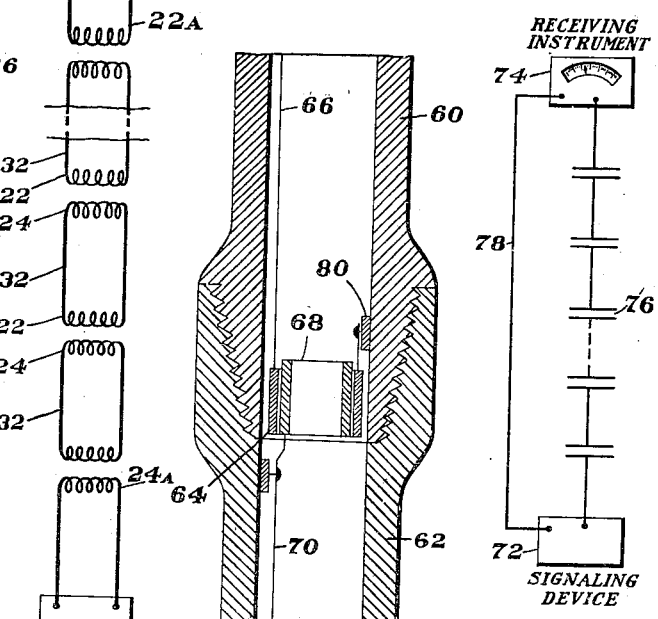
D.G.C. HARE
INVENTOR
BY
HIS ATTORNEYS Patented July 3, 1945

2,379,800

UNITED STATES PATENT OFFICE 2,379,800

SIGNAL TRANSMISSION SYSTEM

Donald G. C. Hare, Houston, Tex., assignor, by mesne assignments, to The Texas Company, New York, N. Y., a corporation of Delaware Application September 11, 1941, Serial No. 410,368

3 Claims. (Cl. 175—356)

This invention relates to signal transmission systems and more particularly to a method and an apparatus for transmitting electrical signals from an instrument at one end of a string of pipe to a receiving device at the other end. The principal object of the invention is the provision of a method and a means for transmitting such signals through a string of drill pipe or tubing from a signaling instrument attached at the lower end of the pipe string to a receiving instrument at the surface, without the necessity of passing a continuous cable through the length of the pipe string or of making electrical connections between adjacent sections of the string as the latter is being made up.

It is frequently necessary when drilling a bore hole or testing a drilled hole or a well to run a surveying or other instrument into the hole by means of a pipe string. Such an instrument may be of the type used for determining the inclination of the hole with respect to the vertical, a device for logging the formations traversed by the hole, a device for locating the upper level of the cement behind the casing or the like. In many of these instances the instrument in the hole is connected electrically to a suitable receiving device at the surface which may be a meter or some form of recorder. When the instrument is attached to the lower end of the pipe string, it has been necessary to pass a cable containing one or more wires throughout the length of the pipe string or to provide each pipe section with a separate length of cable disposed along the inner surface thereof, the ends of these cables then being connected together at the pipe couplings when the pipe string is being made up to be lowered in the hole. It is, of course, extremely difficult to pass a continuous cable through a long pipe string when the sections are being joined, and in those cases where electrical connections are made between separate lengths of cable in the pipe sections, these connections are subject to corrosion and it is thus difficult to make and maintain such connections tight so as to prevent varying amounts of electrical resistance at the connections.

In accordance with one form of the present invention, each section of pipe with the exception of the top and bottom sections of the string is provided with a closed electrical circuit which includes a primary coil of an inductive coupling or transformer at one end, and a secondary coil of another transformer at the other end of the pipe section. When the pipe string is made up the primary coil of one section will be disposed in close proximity to the secondary coil of the adjoining section so that a transformer will be formed at each pipe coupling and a continuous circuit made up of a plurality of separate inductively coupled circuits will thus result. Signals, which may be intermittent impulses of current, variations in the amplitude of an alternating current or variations in frequency of a more or less continuous current will be impressed on the lowermost transformer circuit and will be transmitted from circuit to circuit throughout the length of the pipe string to the receiving device at the surface.

In another embodiment of the invention the separate circuits in the pipe sections may be connected through capacity couplings at the pipe joints and a continuous electrical circuit thus provided.

For a better understanding of the invention reference may be had to the accompanying drawing in which:

Fig. 1 is a vertical sectional view through one of the pipe couplings showing a transformer disposed therebetween;

Fig. 2 is a transverse section taken on the line 2—2 of Fig. 1;

Fig. 3 is a perspective view of adjacent ends of flanged pipe sections showing the transformer coils;

Fig. 4 is a diagrammatic view showing a completed circuit through a pipe string;

Fig. 5 is a diagram showing the arrangement of the transformer circuits between a signaling device and a receiving instrument;

Fig. 6 is a vertical sectional view through a pipe coupling showing a capacity coupling, and Fig. 7 is a diagram showing the connections between a signaling device and a receiver utilizing a capacity coupled circuit.

Referring to the drawing, Fig. 1 illustrates a coupling or joint between two sections 10 and 12 of internal flush-joint pipe. The pin end 14 of the section 10 and the box end 16 of the section 12 are provided with annular grooves 18 and 20 arranged so that when the pipe sections are joined the grooves in the adjoining sections will be in alignment. A coil 22 is disposed in the groove 20 in the pin end of section 10 and another coil 24 is mounted in the corresponding groove in the box end of the section 12. These coils are thus disposed so as to be closely adjacent when the coupling is formed, and each of the coils is provided with wires or leads 26 passing along the inner surface of the pipe sections, preferably within a cover or guard member 28, which serves to protect the leads from abrasion which might be caused by drilling fluid or other material passing through the pipe string. It is understood that one end of each coil may be connected to its respective pipe section and the pipe thus used in place of one wire in each circuit. An annular member 30 of soft iron is adapted to be placed in the grooves 18 when the pipe sections are being joined, this member serving as a core for the transformer coils 22 and 24. It is understood that the upper end of the pipe section 10 will be substantially the same as the box end 16 of the section 12 and that the lower end of the section 12 will be provided with a pin end similar to the pin end 14 of the section 10. Thus, when all of the pipe sections forming the string have been made up as shown in Fig. 1, a plurality of electro-magnetically coupled circuits 32 will be formed, these circuits thus forming a continuous circuit extending from a signaling device 34 attached to the lower end of the string to a receiving instrument 36 at the surface. The lowermost and topmost pipe sections will be provided with a primary coil 24a and a secondary coil 22a, respectively, these coils being connected to the signaling device 34, and the receiving instrument 36 as shown in Figs. 4 and 5. If it is necessary to rotate the pipe string, a suitable collector ring or rings, not shown, may be provided at the surface end of the string in the connections between the upper transformer coil 22a and the receiving instrument 36.

Instead of the inductive couplings which have been described, other electrical coupling means may be utilized in a somewhat similar manner. In Fig. 6 is shown a coupling between the ends of pipes 60 and 62, and secured within the pin end of the pipe section 60 is a cylindrical condenser member 64 connected to another condenser member, not shown, in the box end of the pipe section by means of a wire 66. Connected to and projecting upwardly from the box end of the pipe section 62 is another cylindrical condenser member 68, slightly smaller than the member 64 and arranged so that the smaller member will be telescoped within the larger when the pipe coupling is made up. The member 68 is, of course, connected electrically by means of wire 70 with another condenser member located at the lower or pin end of the pipe section 62.

In Fig. 7 an electrical circuit is illustrated diagrammatically as connecting a signaling device 72 with a receiving instrument 74. Each of the capacity couplings 76 corresponds to a condenser arrangement such as is shown in Fig. 6, and the return side 78 of the circuit comprises the pipe string itself. It is understood that the illustration of the condenser in Fig. 6 is quite diagrammatic and that the two members 64 and 68 will be insulated electrically from the pipe string as by means of insulation 80. The two cylinders 64 and 68 may be disposed within an annular groove at the junction of the pipes in a manner similar to that of Fig. 1. It is further understood that the cylinders 64 and 68 will be of metal and preferably covered with some insulating material which will serve as a dielectric when the members are in their telescoped position.

Although the invention has been described thus far in connection with well logging or surveying, it is also applicable to the transmission of signals or information electrically through other strings of pipe such as, for instance, a pipe line adapted to carry oil or other fluids from one point to another. In Fig. 3 a flanged coupling is shown between adjacent ends of two pipe sections 38 and 40, the ends of these pipes being provided with cooperating flanges 42 and 44, respectively. Each of these flanges is provided with the usual holes 46 through which the flanges may be bolted together and also with an annular groove 48. In each groove is disposed a coil 50, the leads 52 of which pass through the pipe sections, as has been described with reference to Figs. 1 and 2. The grooves 48 are formed so that when the flanges 42 and 44 are in contact, the coils 50 will be in close proximity and in alignment, the two coils then forming an inductive coupling or transformer, as has been previously described. The inductive couplings may have a 1 to 1 ratio, or one of the coils 50 may comprise the primary and the other coil, the secondary, and when a pipe line is made up of sections similar to the lengths 38 and 40, signals can be transmitted through the length of the line, as previously described.

In case it is desired to transmit a signal impulse or impulses from the surface to a device in a hole, the transformer coils could be reversed if the transformer characteristics would make this desirable so that the impulse would be transmitted from a primary coil in the uppermost circuit to a secondary coil in the circuit directly below and so on through the plurality of coupled circuits to the device at the bottom of the string. In this manner a device such as a gun perforator attached to the lower end of a pipe string could be actuated from the surface without the necessity of a continuous cable in the hole or of detachable electrical connections between the pipe sections.

If desired, one or more amplifying stages can be connected in the circuit and may be housed for instance in a special section of pipe provided for that purpose. Such amplifying or booster stages are, of course, in common use in telephone and telegraph circuits.

It will be seen that an electrical system has been provided whereby signals can be transmitted from one length of a pipe string or line to another, and the pipe sections can be joined and disjoined without necessitating the making or breaking of any electrical connections between adjacent pipe sections. The transformer coils are protected from abrasion by materials passing through the pipe and the danger of electrical leakage or an abnormal electrical resistance between connections is eliminated. The coils of the inductive couplings and the condenser cylinders will, of course, be designed to have the proper electrical characteristics, and these will depend somewhat on the nature of the signals to be transmitted and the length of the pipe string. If desired, the separate circuits can be tuned to resonate at a desired frequency of transmission.

Obviously many modifications and variations of the invention, as hereinbefore set forth, may be made without departing from the spirit and scope thereof and, therefore, only such limitations should be imposed as are indicated in the appended claims.

I claim:

1. A pipe coupling for connecting together adjacent ends of a pair of pipes adapted to conduct a fluid, said coupling comprising annular members on the ends of said pipes adapted to be connected together in juxtaposition so that the adjacent ends of the pipes will be in contact with each other, each of said members having an annular groove concentric with the pipe and disposed so as to be out of the path of a fluid flowing through said coupling, and a separate coil winding disposed in each of said grooves, said windings forming an electrical transformer when said members are connected together to make up said coupling.

2. A pipe coupling having a pin section and a cooperating box section, each of said sections being provided with a pair of adjacent inner and outer annular grooves in alignment with a similar pair of grooves in the other section, the grooves in each section being substantially in the same plane normal to the longitudinal axis of that section, a transformer coil winding disposed in the outer groove of each section, and an annular core member disposed in the inner grooves of said sections when said coupling is made up so that said core will be between said coils and the interior of the pipe coupling.

3. A pipe coupling having a pin section and a cooperating box section, each of said sections being provided with a pair of adjacent, concentric, inner and outer annular grooves in alignment with a similar pair of grooves in the other section, the inner grooves of each section being disposed around the inner periphery of that section and the grooves in each section being substantially in the same plane normal to the longitudinal axis of that section, a transformer coil winding disposed in the outer groove of each section, and a single annular core member disposed in the inner grooves of said sections when said coupling is made up so that said core will be flush with the inner surface of the coupling.

DONALD G. C. HARE.